J. WILSON, C. GREEN & W. WILSON, Jr.
SEAMING-MACHINE.
No. 7,018. Reissued March 28, 1876.
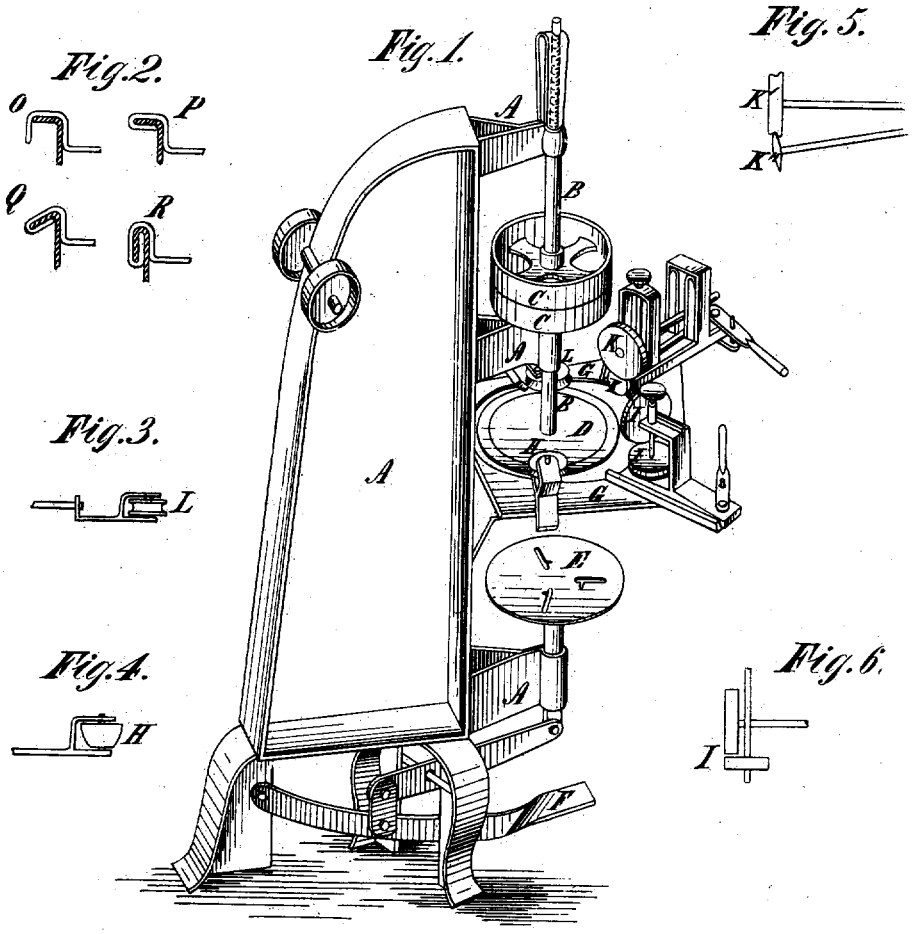
Witnesses:
Edw^d Payson
Geo. W. Miatt
Inventors:
James Wilson
Charles Green
William Wilson Jr
per Edw. E. Quimby
atty.
N. PETERS, PHOTO-LITHOGRAPHER, WASHINGTON, D. C.

UNITED STATES PATENT OFFICE.

JAMES WILSON, CHARLES GREEN, AND WILLIAM WILSON, JR., OF WILMINGTON, DELAWARE.

IMPROVEMENT IN SEAMING-MACHINES.

Specification forming part of Letters Patent No. 23,735, dated April 19, 1859; extended seven years; reissue No. 6,097, dated October 20, 1874; reissue No. 7,018, dated March 28, 1876; application filed December 10, 1875.

*To all whom it may concern:*

Be it known that we, JAMES WILSON, CHARLES GREEN, and WILLIAM WILSON, Jr., of Wilmington, Delaware, have invented a certain Improvement in Seaming-Machines, of which the following is a specification:

Our improvement relates to certain devices for forming either single or double seams upon one or both ends of sheet-metal kegs or cans without the use of any tool, mandrel, former, or supporting-bar in the interior of the cans during the seaming operation.

Our invention consists in the combination with each other, and with suitable operating devices, of two parallel disks, for respectively engaging the opposite ends of a can, and holding the can in prescribed position, and squeezing together the edges of the sheets of metal respectively composing the side and one of the heads of the can.

Hitherto it has been possible to form a seam, either single or double, upon one end of a metal can or keg by inserting therein a suitable tool, over which the seam is to be formed; but by the use of our inventions both ends or heads may be seamed externally, and without the necessity of leaving any hole in either of the heads for the introduction of tools to assist in the work.

The accompanying drawings are as follows: Figure 1 is a view of the machine; Fig. 2, a view of the different stages of the joint produced by the machine. Figs. 3, 4, 5, and 6 are the different rollers.

This machine consists of a stand, A, and a vertical shaft, B B, upon which are a tight and loose pulley, C C. Upon the lower end of this shaft is a metallic disk, D. A second disk, E, is placed directly under the disk D, and is connected with a treadle, F, by which it is elevated or depressed. At the upper end of this shaft is a spring or other suitable contrivance, for the purpose of pressing the upper disk downward. A stand, G, supports a single burring-pulley, H, peaning-down pulleys I, double burring-pulleys K, and a finishing-pulley, L. The burring-pulley H is shown in Fig. 4. It consists of a small pulley-wheel beveled upon its lower edge in such a manner that the flange upon the head of the keg may be bent upon the flange of the cylinder, as shown at O in Fig. 2. The peaning-down pulleys I consist of two small pulley-wheels placed at right angles to each other, as shown in Fig. 6. Their use is to press the flange of the head, bent down by the burring-pulley, firmly upon the flange of the cylinder, as shown at P, Fig. 2. The double burring-pulleys K consist of two pulleys, as shown in Fig. 5. The upper and larger pulley-wheel K′ has a groove upon its edge, in which the smaller and lower pulley-wheel K″ moves. The axis of this lower pulley-wheel is placed at an angle to that of the upper pulley-wheel. The use of this pair of pulley-wheels is to bend the joint produced by the two preceding operations at an angle, as shown at Q, in Fig. 2. The finishing-pulley L consists of a single pulley-wheel, as shown in Fig. 3, having its edge grooved. Its function is to press the joint firmly upon the side of the cylinder, as shown at R in Fig. 2. The peaning-down pulleys I, the double burring-pulleys K, and the finishing-pulley L are constructed in such a manner that they may be pushed in and out by means of a lever-screw, or their equivalent.

The mode of using this machine is as follows: A cylinder of sheet-iron, or any suitable substance, is first made, either plane or corrugated, and provided with a flange upon its edge. Two heads are then struck, by means of a die, from a thin plate of metal. Upon these heads flanges are left double the width of those upon the cylinder. This cylinder, with the heads laid in a proper position, is then placed between the two disks D and E. By means of the treadle, the lower disk is pressed firmly upward thus holding the cylinder tight between them. The cylinder is then made to revolve, by the friction between it and the upper disk, to which the motive power is applied. All the wheels, with the exception of the burring-pulley, are then drawn back. The flange of the head is pressed downward in order that the peaning-down pulleys, which are next pushed inward, may press it firmly upon the flange of the head by the one pulley running above and the other running below the flange.

The peaning-down pulleys are then withdrawn. The next operation is to push the double burring-pulleys inward, which bend the single seam just produced in the two preceding operations downward, causing it to form an acute angle with the side of the cylinder. This pulley being withdrawn, the finishing-pulley is pressed inward, which presses this bent seam firmly against the side of the cylinder. The keg is then inverted, and the other head fastened in the same manner. By these means a double seam is produced on both ends of the keg.

We therefore claim—

1. The two disks D and E, substantially such as described, one of which acts as a mandrel for supporting the inner side of the seam, while both disks, acting together, clamp the outside of the keg or can, in combination with seaming mechanism capable of being moved forward and backward with respect to one of the disks, for the purpose of forming seams externally upon metal kegs or cans, substantially as described.

2. The combination of external seaming mechanism with the two disks D and E, arranged upon rotating shafts, so that they can grasp and rotate a can, and thus bring all parts of the flange of the can under the action of the seaming-tools for the purpose of forming an external seam, while one of the said disks acts as a mandrel for supporting the inner side of the seam so formed, substantially as described.

3. The combination of an external seaming mechanism with two revolving disks, the latter operating to hold the body of the keg or can, and to hold one or both heads in contact therewith, and resist the thrust of the external seaming mechanism, while the heads are being successively seamed on the body of the keg or can, substantially as described.

JAMES WILSON.
CHARLES GREEN.
WM. WILSON, JR.

Witnesses:
W. R. BRINCKLE,
JOS. DE GODT.